United States Patent
Hunter et al.

(10) Patent No.: US 9,041,235 B1
(45) Date of Patent: May 26, 2015

(54) HYDROKINETIC POWER GENERATION SYSTEM

(71) Applicant: Amazon Technologies, Inc., Reno, NV (US)

(72) Inventors: Jerry James Hunter, Medina, WA (US); Michael P. Czamara, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/655,301

(22) Filed: Oct. 18, 2012

(51) Int. Cl.
*F03B 13/00* (2006.01)

(52) U.S. Cl.
CPC ..................... *F03B 13/00* (2013.01)

(58) Field of Classification Search
CPC ....................................... F03B 13/00
USPC ................................ 290/54; 415/7
See application file for complete search history.

(56) References Cited

U.S. PATENT DOCUMENTS

| | | | | |
|---|---|---|---|---|
| 2,501,696 | A * | 3/1950 | Souczek | 290/43 |
| 3,986,787 | A * | 10/1976 | Mouton et al. | 415/7 |
| 4,306,157 | A * | 12/1981 | Wracsaricht | 290/54 |
| 4,383,182 | A * | 5/1983 | Bowley | 290/43 |
| 4,737,070 | A * | 4/1988 | Horiuchi et al. | 415/7 |
| 4,864,152 | A * | 9/1989 | Pedersen | 290/53 |
| 4,868,408 | A * | 9/1989 | Hesh | 290/52 |
| 4,872,805 | A * | 10/1989 | Horiuchi et al. | 415/7 |
| 5,946,909 | A * | 9/1999 | Szpur | 60/398 |
| 6,091,161 | A * | 7/2000 | Dehlsen et al. | 290/43 |
| 6,168,373 | B1 * | 1/2001 | Vauthier | 415/7 |
| 7,441,988 | B2 * | 10/2008 | Manchester | 405/75 |
| 7,492,054 | B2 * | 2/2009 | Catlin | 290/54 |
| 7,682,126 | B2 * | 3/2010 | Parker | 415/3.1 |
| 7,948,106 | B2 * | 5/2011 | Sugano | 290/54 |
| 8,102,071 | B2 * | 1/2012 | Catlin | 290/54 |
| 8,219,257 | B2 * | 7/2012 | Hunt | 700/288 |
| 8,344,535 | B2 * | 1/2013 | Pitre | 290/54 |
| 8,446,026 | B2 * | 5/2013 | Henriksen | 290/42 |

(Continued)

FOREIGN PATENT DOCUMENTS

| | | | | |
|---|---|---|---|---|
| GB | 2195717 | A * | 4/1988 | F03B 3/04 |
| GB | 2256011 | A * | 11/1992 | |

(Continued)

OTHER PUBLICATIONS

Martin Anyi, Brian Kirke "Evaluation of small axial flow hydrokinetic turbines for remote communities" Energy for Sustainable Development 14 (2010) pp. 110-116.
"Hydro-Electric-Barrel Generator" published Jul. 29, 2012 on www.hydro-electric-barrel.com/index, p. 1.
Whitepaper: "In-Stream Hydrokinetic Turbines" published Jul. 29, 2012 pp. 1-6.

*Primary Examiner* — Joseph Waks
(74) *Attorney, Agent, or Firm* — Robert C. Kowert; Meyertons, Hood, Kivlin, Kowert & Goetzel, P.C.

(57) ABSTRACT

A system for generating electrical power includes one or more turbine systems, a linking system, a power receiving station, and a transmission line. The turbine systems includes a turbine, a turbine carrier that can hold the turbine in a flow of water, and a generator that produces electricity from rotation of a runner of the turbine. The linking system couples the turbine carriers to a fixed location. The transmission line transmits power from the generator to the power receiving station.

29 Claims, 7 Drawing Sheets

(56) References Cited

U.S. PATENT DOCUMENTS

| | | | |
|---|---|---|---|
| 8,668,452 B2* | 3/2014 | Henriksen | 416/85 |
| 8,692,404 B2* | 4/2014 | Chauvin | 290/54 |
| 2004/0096310 A1* | 5/2004 | Regan et al. | 415/3.1 |
| 2007/0108768 A1* | 5/2007 | Dempster | 290/42 |
| 2007/0231072 A1* | 10/2007 | Jennings et al. | 405/75 |
| 2007/0241566 A1* | 10/2007 | Kuehnle | 290/53 |
| 2007/0292259 A1* | 12/2007 | Choie | 415/8 |
| 2008/0018115 A1* | 1/2008 | Orlov | 290/54 |
| 2009/0097205 A1 | 4/2009 | Matsushima et al. | |
| 2009/0251860 A1 | 10/2009 | Belady et al. | |
| 2010/0181774 A1* | 7/2010 | Dehlsen et al. | 290/54 |
| 2010/0230971 A1* | 9/2010 | Mackie | 290/54 |
| 2010/0332041 A1* | 12/2010 | Hunt | 700/287 |
| 2011/0058929 A1 | 3/2011 | Smith et al. | |
| 2011/0278928 A1 | 11/2011 | Burger et al. | |
| 2011/0316337 A1 | 12/2011 | Pelio et al. | |
| 2013/0026761 A1 | 1/2013 | Rajadhyaksha et al. | |

FOREIGN PATENT DOCUMENTS

| | | | | |
|---|---|---|---|---|
| GB | 2441821 A | * | 3/2008 | |
| JP | 57068563 A | * | 4/1982 | F03B 3/10 |
| JP | 2003097406 A | * | 4/2003 | |
| JP | 2009114904 A | * | 5/2009 | |
| WO | WO 2006117830 A1 | * | 11/2006 | |

* cited by examiner

HYDROKINETIC POWER GENERATION SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 208V). A network of cabling, bus bars, power connectors, and power distribution units, is used to deliver the power at the lower voltage to numerous specific components in the facility.

One potential source of energy for electrical power is natural bodies of water, such as rivers. Hydroelectric dams, for example, are often used to generate electrical power for utilities. Hydroelectric dams may, however, adversely affect the environment in which they are constructed. For example, dams can disrupt and impair river ecosystems, reduce oxygen levels in the water, and impede migration of fish and other wildlife.

Figure 1:
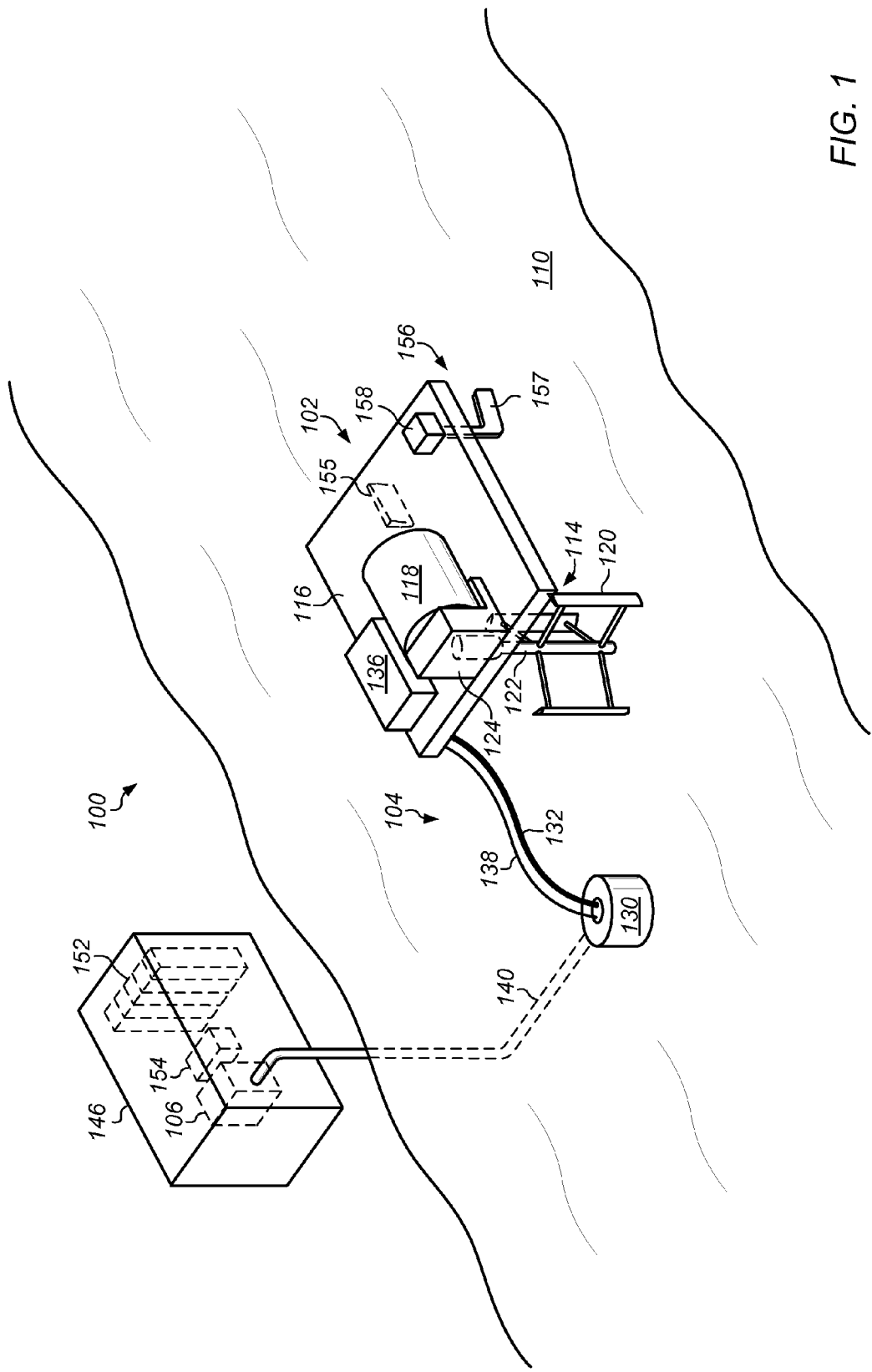
FIG. 1 illustrates one embodiment of a hydrokinetic power generation system having a turbine system tethered to ground.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Systems and methods for reclaiming or generating electrical power from moving water are disclosed. According to one embodiment, a system for generating electrical power includes a turbine system, a tether system, a power receiving station, and a transmission line. The turbine system includes a turbine, a turbine carrier that can hold the turbine in a flow of water, and a generator that produces electricity from rotation of a runner of the turbine. The tether system couples the turbine carrier to a fixed location relative to the ground. The position of the turbine carrier in the flow relative to the fixed location is based on characteristics of the flow. The transmission line transmits power from the generator to the power receiving station.

According to one embodiment, a system for generating electrical power includes one or more turbine systems, a linking system, a power receiving station, and a transmission line. The turbine systems includes a turbine, a turbine carrier that can hold the turbine in a flow of water, and a generator that produces electricity from rotation of a runner of the turbine. The linking system couples the turbine carriers to a fixed location. The transmission line transmits power from the generator to the power receiving station.

According to one embodiment, a method of generating power includes placing a turbine system in a flow of water, linking the turbine system to a fixed location relative to the ground, generating electricity from a flow of the water through or across a runner of the turbine system, and transmitting electrical power from the turbine system to a location on the ground.

As used herein, "hydrokinetic" power generation means generating power by harnessing kinetic energy of moving water.

As used herein, a "linking system" means a system that physically links an element or system, such as a turbine system, to one or more other elements or systems. Elements of a linking system may include, for example, a tether, a beam, a rail, a strut, a post, a pedestal, or combinations thereof.

As used herein, a "runner" means an element, or combination of elements, of a turbine that moves in response to fluid flow. Examples of a runner include a rotor, a propeller, a waterwheel, or a screw.

As used herein, a "screening system" means a system, device, or element that can block or catch objects in a flow of liquid while allowing a flow of liquid through. Examples of screening devices include a mesh, a grate, a grid, or a screen.

As used herein, a "tether" means a flexible member that can carry a tensile load or transmit a pulling load. Examples of a tether include a cable, a cord, a lanyard, a wire, a rope, or a chain.

As used herein, a "tether system" means a system that includes one or more tethers.

As used herein, a "turbine" means a device or system that produces rotary motion from a moving fluid. Examples of turbine types include a blade turbine, helix turbine, bladeless turbine, and statorless turbine. A turbine may be shrouded or unshrouded.

As used herein, a "turbine system" means a system that includes one or more turbines.

As used herein, "air moving device" includes any device, element, system, or combination thereof that can move air. Examples of air moving devices include fans, blowers, and compressed air systems.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "rack computing systems" means a computing system that includes one or more computing devices mounted in a rack.

As used herein, "reserve power" means power that can be supplied to an electrical load upon the failure of, or as a substitute for, primary power to the load.

As used herein, "room" means a room or a space of a building. As used herein, "computer room" means a room of a building in which computing devices, such as rack-mounted servers, are operated.

In some embodiments, a hydrokinetic power generation system includes an open flow turbine system that is linked to ground. FIG. 1 illustrates one embodiment of a hydrokinetic power generation system having a turbine system tethered to ground. Hydrokinetic power generation system 100 includes turbine system 102, linking system 104, electrical power receiving station 106, and power transmission system 108. Turbine system 102 may produce electricity from the flow of water in river 110. Turbine system 102 may transmit electrical power to electrical power receiving station 106.

Turbine system 102 includes turbine 114, turbine carrier 116, and generator 118. Turbine carrier 116 may support turbine 114 and generator 118. In some embodiments, turbine carrier 116 floats at the surface of river 110.

Turbine system 102 is coupled to the ground by linking system 104. Linking system 104 may keep turbine system 102 from being carried downstream by the current in river 110.

Turbine 114 includes runner 120, shaft 122, and gearbox 124. Runner 120 may be in submerged in a free flow of water passing down river 110. Runner 120 may rotate in response to the flow of the current of the river. Rotation of runner 120 may drive an output shaft in gearbox 124. The output shaft of gearbox 124 may be coupled to generator 118. Generator 118 may produce electricity from the rotation of runner 120.

In some embodiments, elements of a drive system for a turbine (such a gearbox 124 shown in FIG. 1) are selected to control a ratio for rotation of a rotor shaft relative to a generator shaft. For example, a sheave and belt system may be used to establish a 10:1 ratio between an input shaft of generator and an output shaft of a runner.

Linking system 104 includes pedestal 130 and tether cable 132. Pedestal 130 may be fixed to the ground in an underwater location in river 110. In some embodiments, tether cable 132 is held in tension as the river current urges turbine carrier 116 downstream.

Power transmission system 108 includes on-board power control system 136, tether cable power transmission lines 138, and ground power transmission lines 140. Electrical power from generator 118 may be received in on-board power control system 136. From on-board power control system 136, electrical power may be transmitted through tether cable transmission lines 138 and ground power transmission lines 140, successively, to electrical power receiving station 106. In some embodiments, on-board power control system 136 includes electrical power storage devices, such as batteries. In some embodiments, electrical power receiving station includes electrical power storage devices, such as batteries or an uninterruptible power supply.

Electrical power receiving station 106 is contained in data center 146. Data center 150 includes rack computing systems 152 and data center power distribution system 154. Power distribution system 154 may draw power from electrical power receiving station 106 and supply electrical power to computing devices in rack computing systems 152. In some embodiments, power distribution system 154 uses power generated by turbine system 102 as a reserve power. For example, power system may draw from turbine-generated power only in the event of a failure of a primary power system. In one embodiment, power distribution system 154 includes an automatic transfer switch that switches power from a primary power system to electrical power receiving station 106 in response to a failure in the primary power system.

In certain embodiments, a system draws from turbine-generated power based on varying loads in the data center. For example, power distribution system 154 draws from electrical power receiving station 106 when loads in the data center exceed a predetermined threshold (for example, during peak operating times).

In some embodiments, electrical energy generated from a turbine air system is used to provide electrical power for operating components of a data center cooling system. For example, electrical power receiving station 106 may be used to supply power to an air moving device, or components of air handling unit or chilled water sub-system. In some embodiments, electrical power receiving station 106 serves as a back-up electrical power system for a cooling system. In one embodiment, electrical power receiving station 106 includes an uninterruptible power supply.

In some embodiments, an hydrokinetic power generation system includes one or more mechanisms for orienting or steering a carrier for the turbine in a flow. For example, hydrokinetic power generation system 100 shown in FIG. 1 includes keel 155 and rudder system 156. Rudder system 156 includes rudder 157 and rudder control device 158. Rudder control device 158 may include a mechanism for positioning rudder 157. Rudder control device 158 may be operated to control the orientation of turbine carrier 116 in river 110. In some embodiments, rudder control device 158 includes, or is connected to, a programmable logic controller.

In FIG. 1, turbine 114 is shown for illustrative purposes as a Darrieus-type vertical-axis turbine. A turbine system may nevertheless be, in various embodiments, of any suitable type for operating in moving water. A turbine may have a horizontal-axis, vertical-axis, or other axis alignment. The flow arrangement of a turbine may axial, radial, or a combination thereof. Examples of runners for a turbine include a set of blades, a propeller, a waterwheel, or a screw. Blades of a turbine may be straight, helical, or other shape. Turbines may be reaction-type or impulse-type. Examples of turbines that may be used, in various embodiments, include a Gorlov helical turbine, a Savonius turbine, or a spherical turbine.

Figure 2:
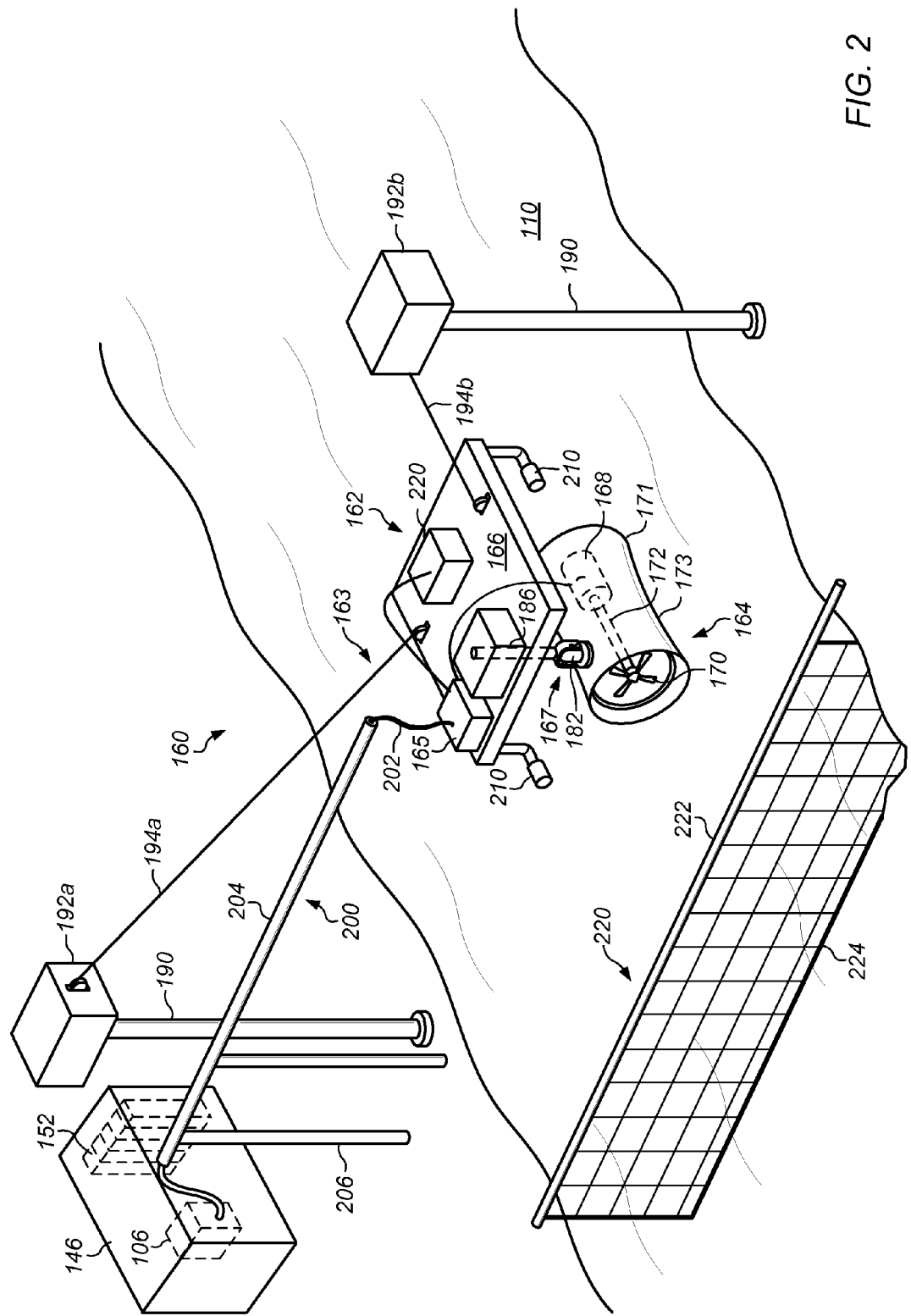
FIG. 2 illustrates one embodiment of a turbine system linked to ground by an overhead tether system.

In some embodiments, a hydrokinetic power generation system includes a free flow turbine system that is linked to the ground by a linking system above the surface of a body of water. FIG. 2 illustrates one embodiment of a turbine system linked to ground by an overhead tether system. Hydrokinetic power generation system 160 includes turbine system 162, linking system 163, electrical power receiving station 106, and power transmission system 168. Turbine system 162 may produce electricity from the flow of water in river 110. Turbine system 162 may transmit electrical power to electrical power receiving station 106.

Turbine system 162 includes turbine 164, main control system 165, turbine carrier 166, orientation control system 167, and generator 168. Turbine carrier 166 may support turbine 164 and generator 168 in river 110. In some embodiments, turbine carrier 166 floats at the surface of river 110.

Turbine system 162 is coupled to the ground by linking system 163. Linking system 163 may keep turbine system 162 from being carried downstream by the current in river 110.

Turbine 164 includes runner 170, flow tunnel 171, and drive shaft 172. Runner 170 may be in submerged in a free flow of water flowing down river 110. Runner 170 may rotate in response to the flow of the current of the river. Rotation of runner 170 may turn shaft 172 to produce power in generator 168. Generator 168 may produce electricity from the rotation of runner 170.

Flow tunnel 171 has a flow passage necks down to a reduced cross section 173 over a portion of its length. The reduced cross section of a passage may increase the velocity of flow in the reduced passage. In some embodiments, the runner of a turbine is located in a part of a passage having a reduced cross section and increased velocity to increase the output of the turbine.

In certain embodiments, the cross sectional area of a passage for a turbine is adjustable. For example, a passage for a turbine may include adjustable vanes or a variable orifice. The cross sectional area may be adjusted manually (for example, before the turbine is placed into the water), automatically (for example, by a controller operating an adjustment mechanism, such as linear actuator), or a combination thereof.

In some embodiments, a turbine is oriented to increase rotation of its rotor (and thus the amount of electricity that can be generated). For example, a rotor may be tilted such that the axis of the rotor is better aligned with the direction of air flow.

Orientation control system 167 includes yaw control mechanism 180 and pitch control mechanism 182. In some embodiments, orientation control system 167 is operated to change to orientation of turbine 164 relative to the flow of water in river 110. Yaw control mechanism 180 may be operated to rotate turbine 164 about a vertical axis (such that runner 170 points toward the left shore or the right shore, for example). Pitch control mechanism 182 may be operated to tilt turbine on a horizontal axis perpendicular to the flow of river 110. Thus, pitch control mechanism 182 can be used to tilt runner 170 up or down in the flow.

In some embodiments, a turbine system includes a mechanism for adjusting the depth of a turbine relative to a carrier. For example, yaw control mechanism 180 may be operable to raise or lower shaft 186 to change the depth of turbine 164 below the surface of the water.

Main control system 165 may control operation of turbine system 162, linking system 164, and transmission of power to electrical power receiving station 106. In one embodiment, main control system 165 includes a programmable logic controller. In some embodiments, orientation and positioning of turbine 164 is controlled by, or part of, a main control system. For example, main control system 165 may control yaw control mechanism 180 and pitch control mechanism 182.

Linking system 163 includes posts 190, positioning mechanisms 192a and 192b, and tether cables 194a and 194b. Posts 190 may be fixed to the ground on the opposing banks of river 110. Positioning mechanisms 192a and 192b may be, for example, winch mechanisms. In some embodiments, tether cables 192a and 192b are held in tension as the river current urges turbine carrier 166 downstream. Either or both of positioning mechanisms 192a and 192b may be operated to move turbine system 164 from one location to another across river 110. For example, positioning mechanism 192a may be operated to draw turbine system 164 toward the left bank of river 110. Positioning mechanism 192b may be operated to draw turbine system 164 toward the right bank of river 110.

Electrical power from generator 168 may be received in main control system 165. Power transmission system 200 may transmit power from main control system 165 to electrical power receiving station 106. Electrical power receiving station 106 may be housed in data center 146. In some embodiments, main control system 136 includes electrical power storage devices, such as batteries. Electrical power receiving station 106 and data center 146 may similar to those described above relative to FIG. 1.

Power transmission system 200 includes power cable 202, power transmission lines 204, and power transmission poles 206. Power transmission cable 202 may transmit power from turbine system 162 to power transmission lines 204. Power transmission lines 204 may transmit power to electrical power receiving station 106. Power transmission lines 204 may be carried on power transmission poles 206.

Hydrokinetic power generation system 160 includes sensors 210. Sensors 210 may be used to gather information on conditions of water in river 110. Information from the sensors may be used to control operation of a turbine system. Sensors 210 may include, for example, flow rate sensors, water level sensors, turbulence sensors, pressure sensors, or temperature sensors. Main control system 165 may control operation of turbine system 162 using information from sensors 210.

In some embodiments, turbine position, orientation, or both, may be changed based on measured flow conditions.

For example, if the flow in river is relatively low, the turbine system may be moved toward the center of the river to increase the velocity of flow through the turbine. In certain embodiments, one or more turbines may be inserted into, or extracted from, the flow based on measured flow conditions.

Main control system 165 may control various functions for generating power with the turbine system 164. Main control system 165 may control, for example, whether turbine system 164 is on or off, a rate of charging of energy storage device, or a gear ratio between runner 170 and an input shaft of generator 168.

Although in the embodiment illustrated in FIG. 2, the orientation system control orientation about two axes, a turbine mounting system may, in various embodiments, allow for orientation of a turbine in any direction. In some embodiments, a turbine is mounted on a system that allows rotation in any axis, such as an eyeball mount or gimbal system.

In some embodiments, a turbine system is controlled based on conditions in an electrical power system, such electrical power receiving station 106 or data center power distribution system 154. For example, if the charge in batteries in UPSs in data center power distribution system 154 has dropped below a predetermined threshold, turbine system 164 may be moved to a location that produces more electricity (for example, to a location with a higher flow).

In some embodiments, electrical energy produced from a turbine is stored on a turbine carrier. For example, system 160 shown in FIG. 2 includes on-board electrical energy storage device 218. In some embodiments, a portable electrical collection system (which may be, for example, on a separate vessel) may be positioned on or next to turbine carrier 166. Stored electrical energy may be extracted from on-board electrical energy storage device 218 and transported another location. In some cases, on-board electrical energy storage device 218 may be used to store electrical energy produced after a failure of power transmission line from turbine carrier 166.

Screen system 220 is located upstream from turbine system 162. Screen system 220 includes rail 222 and screen 224. Rail 222 may span across river 110. Rail 222 may support screen 224 in the flow of river 110. Screen system 220 may inhibit objects being carried in the flow of river 110 from reaching turbine system 162, thus protecting components of turbine system 162, such as runner 170.

In the system illustrated in FIG. 2, screen system 220 is shown as a separate from the turbine carrier. In screen system may nevertheless, in some embodiments, be attached to, or part of, a turbine or a carrier for a turbine. For example a screen may be mounted on the upstream side of turbine carrier 116.

Figure 3:
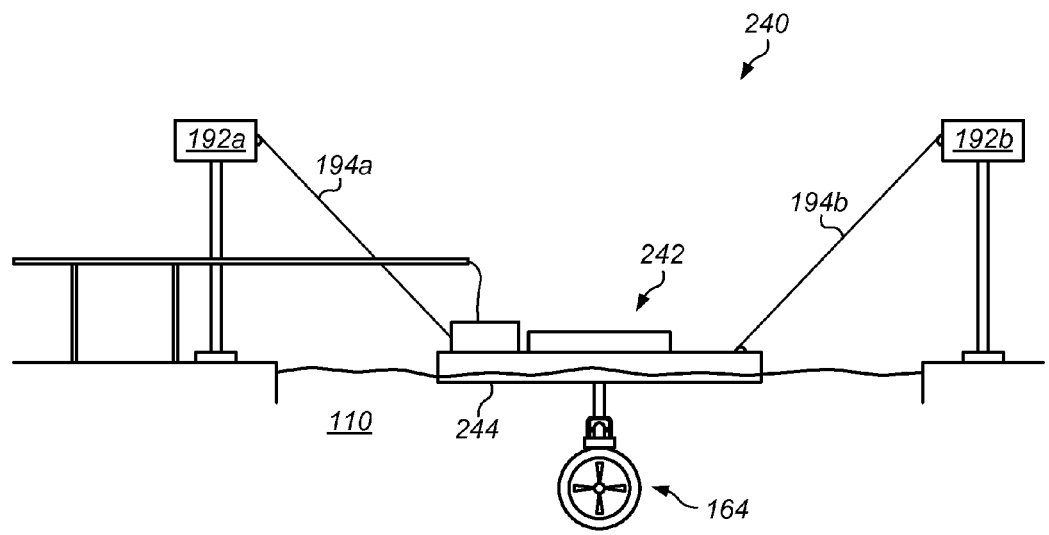
FIG. 3 is a front schematic view illustrating a floating turbine system.

FIG. 3 is a front schematic view illustrating a floating turbine system. System 240 includes turbine system 242. Turbine system 242 includes carrier 244 and turbine 164. Turbine carrier 244 may float on the surface of river 110. Turbine system 242 may be held in position on river 110 by cables 194a and 194b. Positioning mechanisms 192a and 192b may be operated to control the position of turbine system 242 on the surface of river 110.

Figure 4:
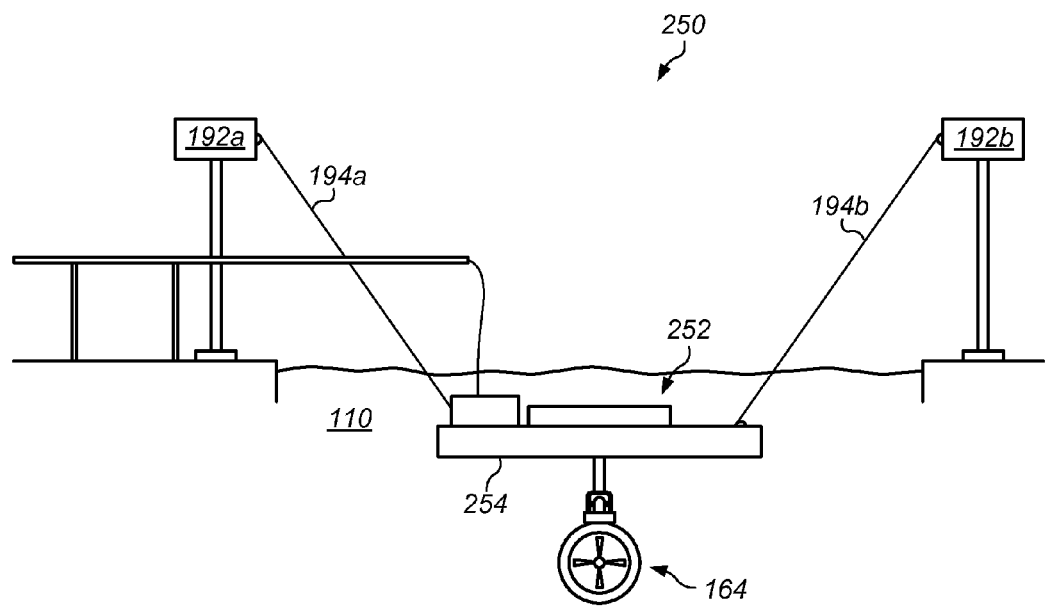
FIG. 4 is a front schematic view illustrating a submerged turbine system.

In some embodiments, a carrier for a turbine is located under the surface of a body of water. FIG. 4 is a front schematic view illustrating a submerged turbine system. System 250 includes turbine system 252. Turbine system 252 includes carrier 254 and turbine 164. Turbine carrier 254 may be submerged in river 110. Turbine system 252 may be held in position in river 110 by cables 194a and 194b. Positioning mechanisms 192a and 192b may be operated to control the position of turbine system 252 in river 110. Positioning mechanisms 192a and 192b may be operated to control the depth of turbine 164. For example, positioning mechanisms 192a and 192b may reel out cables 194a and 194b to lower turbine 164 relative to the surface of river 110, and reel in cables 194a and 194b to raise turbine 164 relative to the surface of river 110.

Figure 5:
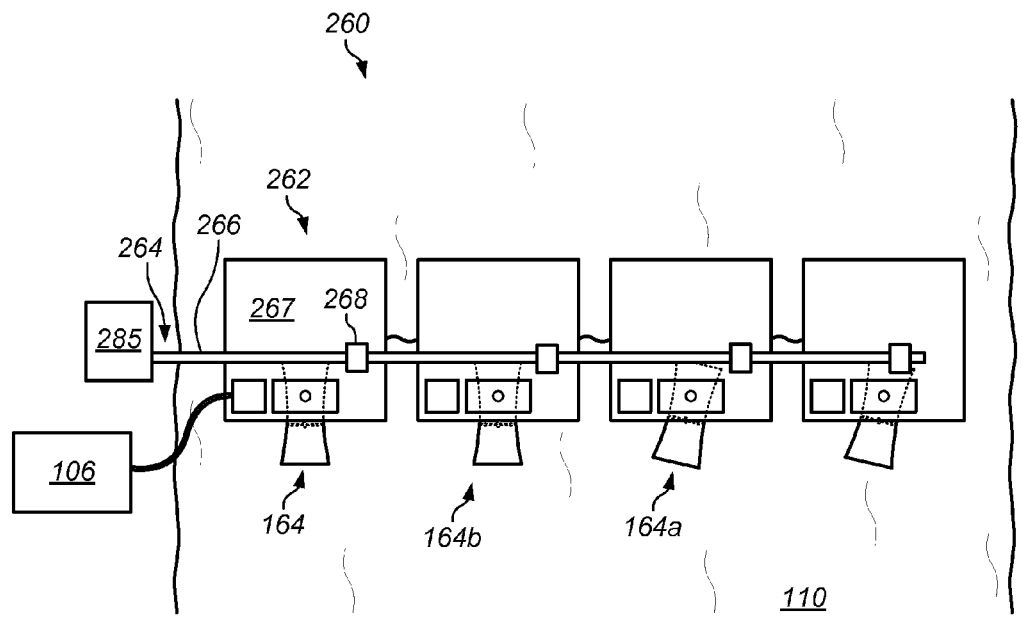
FIG. 5 is a top schematic view illustrating a bank of turbines linked to ground by a rail-based positioning system.

In some embodiments, a hydrokinetic power generation system includes multiple turbine systems that are linked to the ground. FIG. 5 is a top schematic view illustrating a bank of turbines linked to ground by a positioning system. System 260 includes turbine systems 262 and linking system 264. Linking system 264 includes pedestal 265 and rail 266. Rail 266 is mounted on pedestal 265. Rail 266 may extend over a portion of river 110. Each of turbine systems 262 includes carrier 267 and positioning device 268. Each of positioning devices 268 may connect one of turbine systems 262 to rail 266. In some embodiments, each one of positioning devices 268 can be operated to move one of turbine systems 262 to a different position relative to the banks of river 110. Each of positioning devices 268 may include a mechanism for moving the carrier of a turbine system to a different location on rail 266. The mechanism may be, for example, a motorized drive system.

In some embodiments, each of turbine systems 262 can be independently positioned relative to rail 266. In other embodiments, some or all of the turbine systems 262 in the bank of turbine systems are cross-coupled such that the turbine systems 262 move with one another. In some embodiments, each of turbines 164 can be independently oriented from the other turbines in the bank. For example, in the embodiment illustrated in FIG. 1, turbine 164a has been adjusted point in a different direction than turbine 164b.

Although in the embodiment show in FIG. 1, there is a one-to-one relationship between turbines and carriers, a hydroelectric system may, in some embodiments, include a carrier with two or more turbines.

Figure 6:
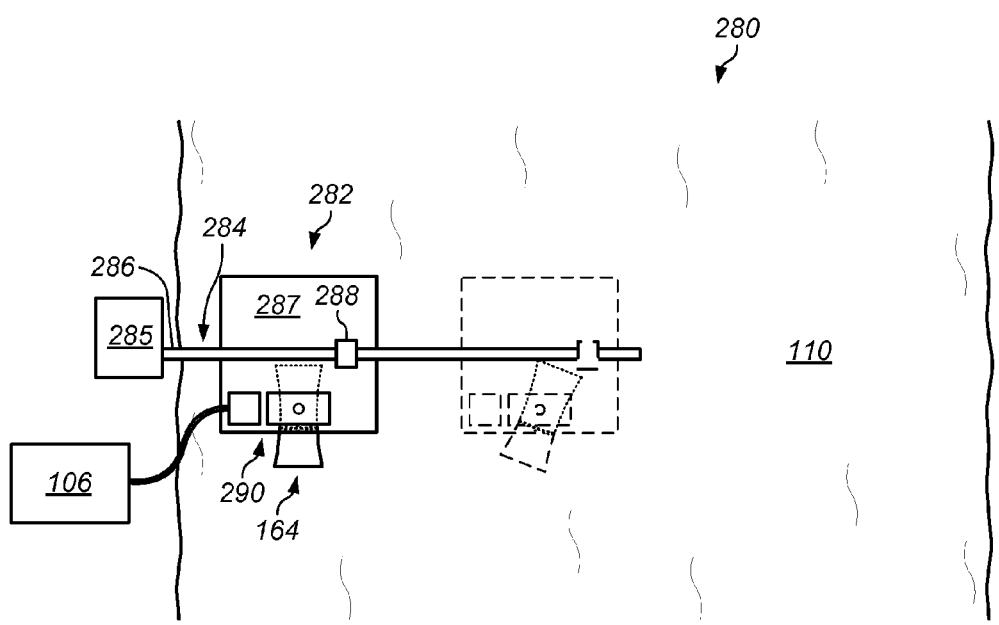
FIG. 6 illustrates adjusting the position and orientation of a turbine in a flow.

FIG. 6 illustrates adjusting the position and orientation of a turbine in a flow. System 280 includes turbine system 282 and linking system 284. Linking system 284 includes pedestal 285 and rail 286. Rail 286 is mounted on pedestal 285. Rail 286 may extend over a portion of river 110. Each of turbine systems 282 includes turbine 164, carrier 287, positioning device 288, and orientation system 290. Positioning device 288 may connect turbine system 282 to rail 286. Positioning device 288 may be operated to move turbine system 282 to a different position relative to the banks of river 110. Orientation system 290 may be operated to orient turbine 164. For example, in FIG. 1, the solid lines show turbine system 282 at one position and orientation, and the dashed line show turbine system 282 moved to a different position on rail 286, and with turbine 164 at a different orientation. The arrows show the direction of movement from the first position to the second position.

In hydrokinetic systems including two or more turbine systems, the outputs of the generators of may be wired in series, in parallel, or combination of series and parallel. In one embodiment, a series connection for two or more turbine generators is used to produce a higher output voltage for a set of turbines. In certain embodiments, a controller may be operated to switch between a series connection and a parallel connection based on conditions in the system.

In certain embodiments, the number of active turbines or generators in a system may be controlled based on operating conditions. For example, if two turbines are producing insufficient power to meet the needs of the system, an additional turbine system may be activated. In some embodiments, the number of active turbines is controlled in response to flow conditions. For example, under high flow conditions, a single turbine may operate to provide sufficient power, while under low flow conditions, three turbines may be needed to provide the same amount of power.

Figure 7:
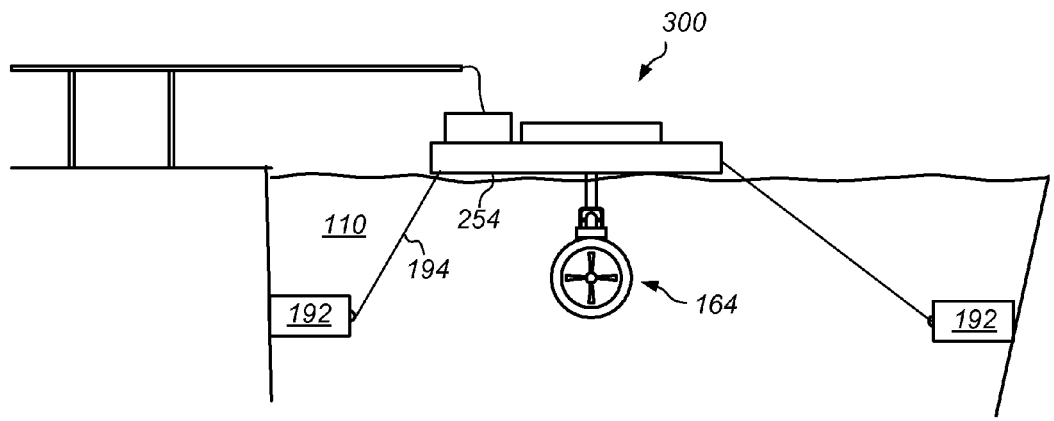
FIG. 7 illustrates on embodiment of a system including dual underwater tether systems. The position of turbine system 300 may be controlled by either or both of positioning mechanisms 192.

FIG. 7 illustrates on embodiment of a system including dual underwater tether systems. The position of turbine system 300 may be controlled by either or both of positioning mechanisms 192.

Figure 8:
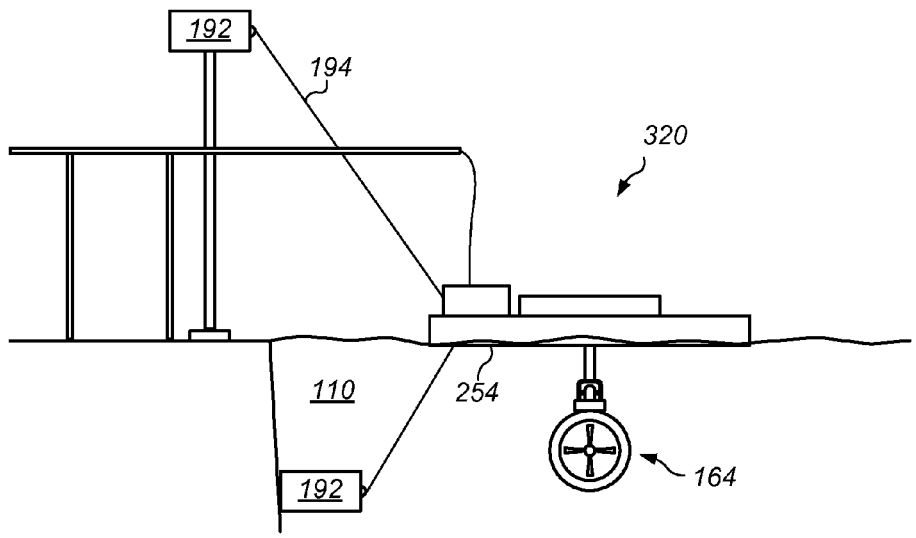
FIG. 8 illustrates an embodiment of a system including one tether system above a turbine carrier and another tether system below the turbine system.

FIG. 8 illustrates an embodiment of a system including one tether system above a turbine carrier and another tether system below the turbine system. The position of turbine carrier may be controlled by either or both of positioning mechanisms 192. In some embodiments, the level of turbine system 320 relative to the river surface is controlled using undersurface positioning mechanism and above-surface positioning mechanism.

Figure 9:
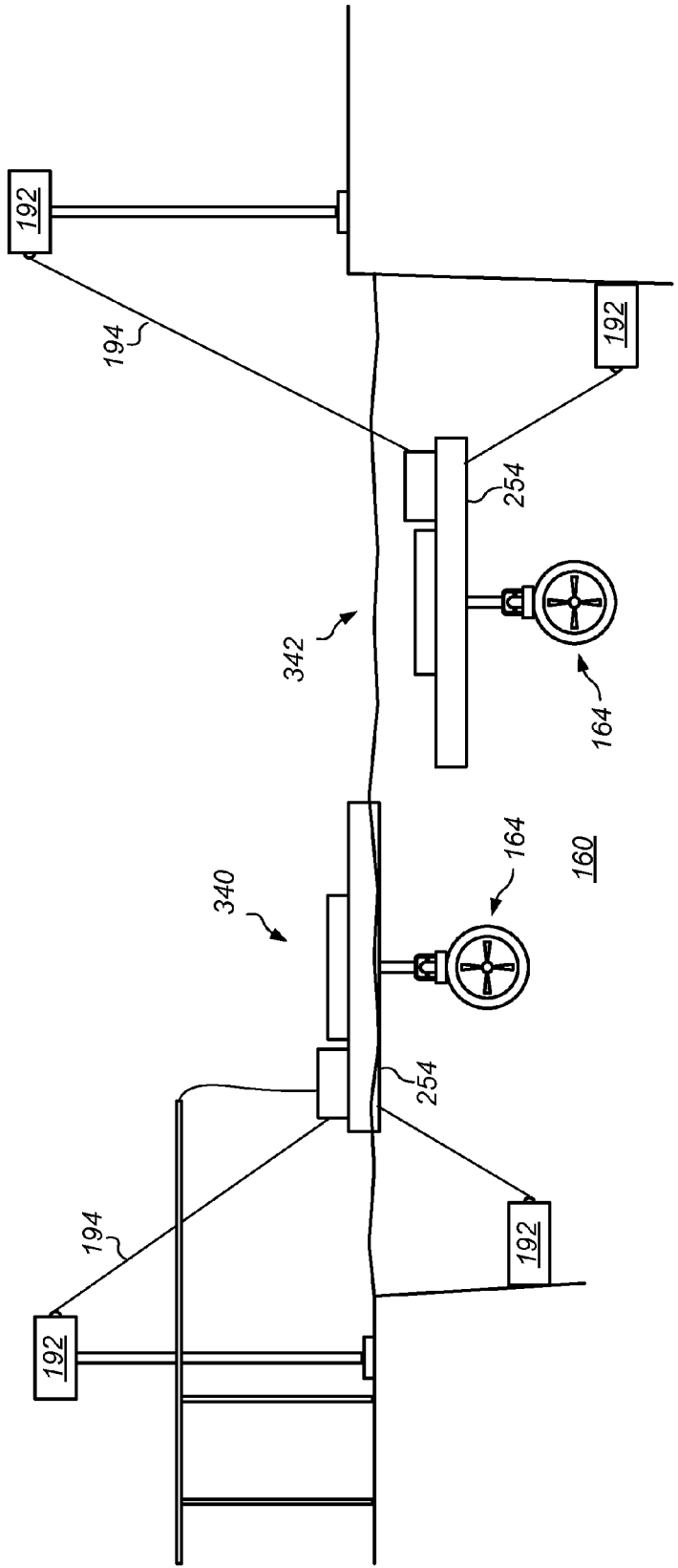
FIG. 9 illustrates one embodiment of a multiple turbine system having turbine systems at different levels in a flow.

FIG. 9 illustrates one embodiment of a multiple turbine system having turbine systems at different levels in a flow. Turbine system 340 may be held on the surface of river 110. Turbine system 342 may be held below the surface of river 110. undersurface positioning mechanisms and above-surface positioning mechanisms, or both, may be used to raise or lower turbine carrier.

Figure 10:
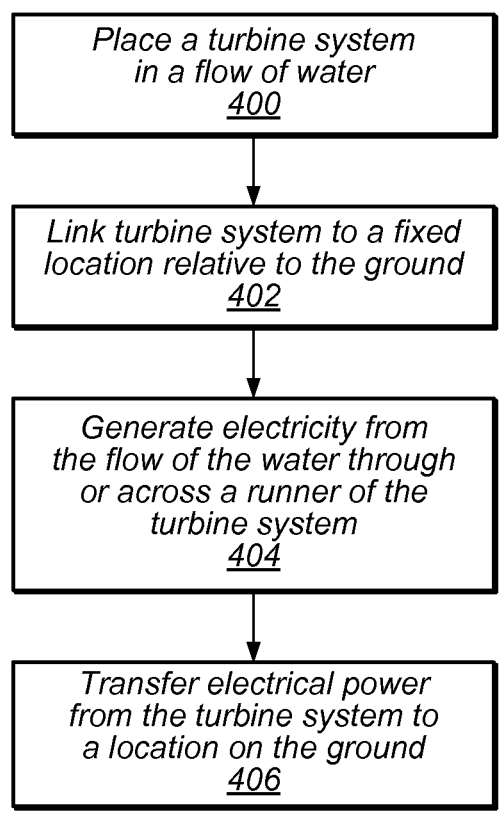
FIG. 10 illustrates generating power with a turbine system in flow of water.

In some embodiments, a turbine system that is linked to the ground generates power from a free flow of water. FIG. 10 illustrates generating power with a turbine system in a flow of water. At 400, a turbine system is placed in a flow of water. The turbine system may be placed, for example, in a river or a stream. In some embodiments, the flow is an open flow in which a portion of the flow is unaffected by the presence of the turbine system. In some embodiments, two or more turbine systems are placed in a flow of water.

At 402, the turbine system is linked to a fixed location relative to the ground.

In some embodiments, the turbine system is tethered to the ground (for example, by way of a cable). The turbine system may be linked to the ground by way of an intermediate structure, such as a bridge, pedestal, post, pedestal, or boardwalk.

At 404, electricity is generated from flow of the water through or across a runner of the turbine system. In some embodiments, the turbine is oriented, positioned, or both, to promote motion of the runner. The turbine may be pointed, shifted, or moved to a different depth based on characteristics of flow of water, such as flow rate or depth.

At 406, electrical power from the turbine system is transmitted to a location on the ground. The turbine system may supply power to a power receiving station on the ground. In some embodiments, a turbine system provides electrical power to electrical loads in a data center. In certain embodiments, a turbine system is used to provide supplemental or back-up power to the data center.

In many of the embodiments illustrated in the Figures, the carrier for a turbine system has been shown as a rectangular raft. A carrier may nevertheless, in various embodiments, be of any shape or size. In some embodiments, a carrier includes one or more pontoons or buoys. In certain embodiments, a carrier for a turbine has a conic shape above the surface of the water.

In many of the embodiments illustrated in the Figures, a carrier for a turbine system is tethered by way of cables from above. A carrier for a turbine system may, nevertheless, in various embodiments be linked to the ground in other manners. In certain embodiments, a turbine system is mounted to the banks by a post, a rail, or a pole. In some embodiments, a turbine system is coupled to ground by way of an intermediate structure, such as bridge.

In many of the embodiments illustrated in the Figures, the turbine system operates in a river. A turbine system may, however, operate in other bodies of water having a natural or artificial flow of water, such as a stream, waterway, or other watercourse.

In many of the embodiments illustrated in the Figures, the power cables and physical linking system for a turbine system have been shown as separate elements from one another. Power cables and physical linking system may nevertheless, in some embodiments, be integrated with one another. In one embodiment, a power cable that transmits electrical power from a turbine system and a mechanical linking element for the turbine system are coaxial with one another. For example, the power cable for transmitting power from a floating turbine system to ground may be contained in a protective sheath that also serves as a tether for the turbine system.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for generating electrical power, comprising:
    a turbine system, comprising:
        a turbine comprising one or more runners;
        a turbine carrier configured to hold the turbine in a flow of water; and
        a generator configured to produce electricity from rotation of at least one of the runners, wherein at least one of the runners is configured to rotate in response to the flow;
    a tether system comprising one or more tethers, wherein the tether system is configured to:
        couple the turbine carrier to a fixed location, and
        adjust a distance from the fixed location to the turbine carrier in a direction, wherein the direction is orthogonal to the flow and parallel to a surface of the flow,
        wherein to adjust the distance from the fixed location to the turbine carrier the tether system is configured to adjust a length of at least one of the one or more tethers at least partially based on one or more characteristics of the flow;
    a power receiving station on the ground; and
    a transmission line configured to transmit power from the generator to the power receiving station.

2. The system of claim 1, wherein the tether system is configured to couple the turbine system to an underwater location.

3. The system of claim 1, wherein the tether system is configured to suspend at least one of the one or more turbine systems from a location that is fixed relative to ground, wherein the fixed location is above the surface of the water.

4. The system of claim 1, wherein the tether system is configurable to control the position or orientation of at least one of the runners relative to the flow.

5. A system for generating electrical power, comprising:
    one or more turbine systems, wherein each of at least one of the one or more turbine systems comprises:
        a turbine comprising one or more runners; and
        a turbine carrier configured to hold the turbine in a flow of water;
        a generator configured to produce electricity from rotation of at least one of the runners, wherein at least one of the runners is configured to rotate in response to the flow;
    a linking system configured to couple the turbine carrier of at least one of the one or more turbine systems to a fixed location;

wherein the linking system is further configured to adjustably position the turbine carrier in the flow relative to the fixed location, wherein to adjustably position the turbine carrier in the flow relative to the fixed location the linking system is configured to adjust a distance from the fixed location to the turbine carrier in a direction orthogonal to the flow and parallel to a surface of the flow at least partially based on one or more characteristics of the flow; and an electrical energy storage device.

6. The system of claim 5, wherein the flow is a natural flow.

7. The system of claim 6, wherein the linking system comprises one or more tethers configured to couple at least one of the one or more turbine systems to a fixed location.

8. The system of claim 5, wherein the linking system is configured to couple at least one of the one or more turbine systems to an underwater location.

9. The system of claim 5, wherein the linking system is configured to couple at least one of the one or more turbine systems to a ground location above the surface of the water.

10. The system of claim 5, wherein the linking system comprises a first positioning mechanism coupled to at least one of the one or more turbine systems and a second positioning mechanism, wherein the first positioning mechanism couples to the at least one turbine system from a location above the surface of the water and wherein the second positioning mechanism couples to the at least one turbine system from a location below the surface of the water.

11. The system of claim 5, wherein the linking system comprises two or more linking members, wherein each of at least one of the linking members is configured to couple at least one of the one or more turbine systems to two different locations that are fixed relative to ground.

12. The system of claim 5, wherein the one or more turbine systems comprises two or more turbine systems, wherein each of at least one of the turbine systems is coupled to a location fixed relative to the edge of the flow via the linking system by a different linking member than at least one other of the turbine systems.

13. The system of claim 12, wherein each linking member is configured to independently interact with a portion of the linking system to independently adjustably position a different one of the two or more turbine systems at a different position in the flow relative to the edge of the flow.

14. The system of claim 5, wherein the turbine carrier for at least one of the one or more turbine systems is configured to float on the water.

15. The system of claim 5, wherein the turbine carrier for at least one of the one or more turbine systems is configured to be submerged under the surface of the water.

16. The system of claim 5, wherein the location of the turbine of at least one of the one or more turbine systems depends on the water level.

17. The system of claim 5, wherein the location or orientation of the turbine of at least one of the one or more turbine systems depends on the direction or rate of flow of the water.

18. The system of claim 5, further comprising a controller coupled to at least one of the one or more turbine systems, wherein the controller is configured to control a position or orientation of at least one of the runners relative to the flow.

19. The system of claim 5, further comprising one or more sensors coupled to a controller, wherein at least one of the sensors is configured to sense at least one characteristic of the flow, wherein the controller is configured to control at least one of the one or more turbine systems in response to information from at least one of the one or more flow sensors.

20. The system of claim 5, further comprising a controller coupled to at least one of the turbine systems, wherein the controller is configured to control an orientation of at least one of the runners relative to the flow.

21. The system of claim 5, further comprising a controller coupled to at least one of the one or more turbine systems, wherein the controller is configured to control a wiring configuration of at least two of the turbine systems.

22. The system of claim 5, further comprising a controller coupled to at least one of the one or more turbine systems, wherein the controller is configured to control a number of active turbine systems in the system.

23. The system of claim 5, wherein the linking system is configurable to control a position or orientation of at least one of the runners relative to the flow.

24. The system of claim 5, further comprising a screening system upstream from at least one of the one or more turbine systems, wherein the screening device is configured to inhibit objects in the flow from contacting components of the turbine system.

25. The system of claim 5, further comprising a data center coupled to the power receiving station, wherein the data center is configured to receive power from the power receiving station.

26. A method of generating power, comprising:
placing a turbine system in a flow of water, wherein the turbine system comprises:
a turbine comprising one or more runners;
a turbine carrier configured to hold the turbine in a flow of water; and
a generator configured to produce electricity from rotation of at least one of the runners;
linking the turbine system to a fixed location;
generating electricity from a flow of the water through or across at least a portion of a runner of the turbine system;
adjustably controlling a position of the turbine carrier in the flow of water based at least in part on adjusting a distance from the fixed location to the turbine carrier in a direction orthogonal to the flow and parallel to a surface of the flow;
adjustably controlling an orientation of the turbine relative to the turbine carrier in response to a determined one or more characteristics of the flow; and
transferring electrical power from the turbine system to a location on the ground.

27. The method of claim 26, wherein linking the turbine system to a fixed location relative to ground comprises tethering the turbine system to the fixed location relative to the ground.

28. The method of claim 26, further comprising controlling a position or orientation of at least one runner of the turbine system.

29. The method of claim 26, wherein generating electricity from flow of the water through or across at least a portion of a runner of the turbine system comprises controlling a position or orientation of at least one runner of the turbine system based on one or more characteristics of the flow.

* * * * *